(12) United States Patent
Wei et al.

(10) Patent No.: US 11,915,470 B2
(45) Date of Patent: Feb. 27, 2024

(54) TARGET DETECTION METHOD BASED ON FUSION OF VISION, LIDAR, AND MILLIMETER WAVE RADAR

(71) Applicant: Quanzhou Equipment Manufacturing Research Institute, Fujian (CN)

(72) Inventors: Xian Wei, Fujian (CN); Jielong Guo, Fujian (CN); Chao Li, Fujian (CN); Hai Lan, Fujian (CN); Dongheng Shao, Fujian (CN); Xiaoliang Tang, Fujian (CN); Xuan Tang, Fujian (CN); Zhiyuan Feng, Fujian (CN)

(73) Assignee: Quanzhou Equipment Manufacturing Research Institute, Fujian (CN)

( * ) Notice: Subject to any disclaimer, the term of this patent is extended or adjusted under 35 U.S.C. 154(b) by 121 days.

(21) Appl. No.: 17/746,697

(22) Filed: May 17, 2022

(65) Prior Publication Data
US 2022/0277557 A1 Sep. 1, 2022

Related U.S. Application Data

(63) Continuation of application No. PCT/CN2020/121753, filed on Oct. 19, 2020.

(30) Foreign Application Priority Data

May 8, 2020 (CN) .......................... 202010380040.9

(51) Int. Cl.
*G06V 10/80* (2022.01)
*G06V 10/25* (2022.01)
(Continued)

(52) U.S. Cl.
CPC .......... *G06V 10/806* (2022.01); *G01S 13/865* (2013.01); *G01S 13/867* (2013.01);
(Continued)

(58) Field of Classification Search
None
See application file for complete search history.

(56) References Cited

U.S. PATENT DOCUMENTS

| 9,714,833 | B2* | 7/2017 | Sham | G01C 11/02 |
| 10,408,939 | B1 | 9/2019 | Kim et al. | |
| 11,100,646 | B2* | 8/2021 | Vora | G06T 7/248 |
| 2007/0152804 | A1* | 7/2007 | Breed | G01S 19/47 |
| | | | | 701/301 |

FOREIGN PATENT DOCUMENTS

| CN | 101782646 A | 7/2010 |
| CN | 102682455 A | 9/2012 |

(Continued)

OTHER PUBLICATIONS

International Search Report and English Translation cited in PCT/CN2020/121753 dated Jan. 29, 2021, 7 pages.

(Continued)

*Primary Examiner* — James M Hannett
(74) *Attorney, Agent, or Firm* — Cooper Legal Group LLC

(57) ABSTRACT

A target detection method based on fusion of vision, lidar and millimeter wave radar comprises: obtaining original data detected by a camera, a millimeter wave radar, and a lidar, and synchronizing the millimeter wave radar, the lidar, and the camera in time and space; performing a calculation on the original data detected by the millimeter wave radar according to a radar protocol; generating a region of interest by using a position, a speed, and a radar reflection area obtained from the calculation; extracting feature maps of a point cloud bird's-eye view and the original data detected by the camera; projecting the region of interest onto the feature maps of the point cloud bird's-eye view and the original data detected by the camera; fusing the feature maps of the point (Continued)

cloud bird's-eye view and the original data detected by the camera, and processing a fused image through a fully connected layer.

7 Claims, 4 Drawing Sheets

(51) Int. Cl.
*G06V 20/58* (2022.01)
*G06V 10/77* (2022.01)
*G06V 10/82* (2022.01)
*G06V 10/10* (2022.01)
*G01S 13/86* (2006.01)
*G01S 13/931* (2020.01)

(52) U.S. Cl.
CPC .............. *G06V 10/16* (2022.01); *G06V 10/25* (2022.01); *G06V 10/7715* (2022.01); *G06V 10/82* (2022.01); *G06V 20/58* (2022.01); *G01S 13/931* (2013.01); *G06V 2201/07* (2022.01)

(56) References Cited

U.S. PATENT DOCUMENTS

| | | | |
|---|---|---|---|
| 2020/0302612 A1* | 9/2020 | Marrero | G06T 7/12 |
| 2021/0342608 A1* | 11/2021 | Smolyanskiy | G06V 10/454 |
| 2023/0040994 A1* | 2/2023 | Matsunaga | G06V 10/806 |

FOREIGN PATENT DOCUMENTS

| | | |
|---|---|---|
| CN | 103935364 A | 7/2014 |
| CN | 106908783 A | 6/2017 |
| CN | 207636768 U | 7/2018 |
| CN | 108509972 A | 9/2018 |
| CN | 110058597 A | 7/2019 |
| CN | 110726990 A | 1/2020 |
| CN | 110794406 A | 2/2020 |
| CN | 111352112 A | 6/2020 |

OTHER PUBLICATIONS

Written Opinion and English Translation cited in PCT/CN2020/121753 dated Jan. 29, 2021, 5 pages.

* cited by examiner

TARGET DETECTION METHOD BASED ON FUSION OF VISION, LIDAR, AND MILLIMETER WAVE RADAR

RELATED APPLICATIONS

This application is a continuation of and claims priority to International patent application number PCT/CN2020/121753, filed on Oct. 19, 2020, which claims priority to Chinese patent application number 202010380040.9, filed on May 8, 2020. International patent application number PCT/CN2020/121753 and Chinese patent application number 202010380040.9 are incorporated herein by reference.

FIELD OF THE DISCLOSURE

The present disclosure relates to the technical field of target detection, in particular to a target detection method based on vision, lidar, and millimeter wave radar.

BACKGROUND OF THE DISCLOSURE

As the country vigorously promotes the development of artificial intelligence and the rapid formation of the intelligent transportation industry, the areas of intelligent parking, Internet of Vehicles, and autonomous driving are developing rapidly. Target detection technology has become an important research direction. Target detection is the most important and basic research field in the field of autonomous driving. The autonomous driving of vehicles is inseparable from the accurate and rapid detection of surrounding obstacles. In target detection, vehicles rely on sensors to obtain information around the vehicle, including lidar, millimeter wave radar, ultrasonic radar, and vision cameras. Lidar has strong anti-interference ability, high resolution, and high ranging accuracy, but the applicability of lider is poor in rain and fog, and the data is output in point cloud format, which requires a large amount of calculation. Millimeter wave radar has low ranging accuracy. However, the millimeter wave radar has strong penetrability, is suitable for all-weather, is suitable for relatively harsh environments, and produces a small amount of data. In order to ensure vehicle safety and accurately realize environmental perception, multi-sensor fusion technology needs to be used for data redundancy processing.

Obstacle detection methods usually include machine vision-based detection methods and radar-based detection methods. The detection methods based on machine vision have the advantages of wide detection range and a large amount of information. The millimeter wave radar has the advantages of wide detection range, good adaptability, ability to penetrate rain and fog, and ability to directly obtain depth information. In the prior art, methods for detecting obstacles using a single sensor include: Chinese patent application number CN201210143389.6 "A method for detecting forward vehicles based on monocular vision", and Chinese patent application number CN201410193393.2 "Automotive Active Anti-collision Warning System", which is based on millimeter wave radar, Chinese patent application number CN201710100068 "Obstacle detection method based on multi-sensor information fusion", etc.

In recent years, obstacle detection methods based on multi-sensor information fusion are one of the hotspots of research. For example, Chinese patent application number CN201810038468.8 discloses an obstacle feature extraction method based on millimeter waves and lidar.

However, the existing methods have shortcomings. In target-level fusion, the target detected by the vision camera and the target detected by the millimeter wave radar are used to compare the results. In the visual camera detection stage, a large number of anchor points are generated, which consumes computing resources. The proportion of the generated anchor points is fixed in size, and the accuracy of obstacles of different proportions, such as large vehicles and pedestrians, is reduced. In feature-level fusion, the existing patents use millimeter wave radar to generate candidate regions and process the candidate regions. This method cannot accurately detect the target when the millimeter wave radar misses the target.

BRIEF SUMMARY OF THE DISCLOSURE

The present disclosure provides a target detection method based on fusion of vision, lidar, and millimeter wave radar to solve the deficiencies in the background.

In order to solve the technical problem, a technical solution of the present disclosure is as follows.

A target detection method based on fusion of vision, lidar and millimeter wave radar, comprising: (1) obtaining original data detected by a camera, a millimeter wave radar, and a lidar, and synchronizing the millimeter wave radar, the lidar, and the camera in time and space; (2) performing a calculation on the original data detected by the millimeter wave radar according to a radar protocol; (3) using a position based on the original data, which is detected by the millimeter wave radar and has been calculated, as a first anchor point, and generating a first region of interest, which is three-dimensional, according to a speed and a radar reflection area with the first anchor point as a center of the first region of interest; (4) generating a second anchor point arranged according to a specified distance in a blind area in which radar points of the millimeter wave radar are not generated, and generating a second region of interest by traversing the second anchor point with the second anchor point as a center of the second region of interest; (5) preprocessing the original data detected by the lidar to generate a point cloud bird's-eye view, and extracting a feature map of the point cloud bird's-eye view and a feature map of the original data detected by the camera; (6) projecting the first region of interest and the second region of interest generated in step 3 and step 5, which are three-dimensional, onto the feature map of the point cloud bird's-eye view and the feature map of the original data detected by the camera; and (7) fusing the first region of interest, the second region of interest, the feature map of the point cloud bird's-eye view, and the feature map of the original data detected by the camera, which have a same size, to form a fused image, processing the fused image through a fully connected layer, and outputting an image of a test result.

In a preferred embodiment, camera data, millimeter wave radar data, and lidar data are obtained in step (1). A camera and a lidar are installed on a top of a vehicle, as shown in FIG. 1. When the lidar sweeps across a center of the camera's Field of View (FOV), exposure of the camera will be triggered. The camera runs at 12 Hz, while the lidar runs at 20 Hz. The exposure of the camera, which runs at 12 Hz, is distributed as evenly as possible in scans of the lidar, which runs at 20 Hz, so not all of the scans of the lidar have corresponding frames of the camera and corresponding frames of the millimeter wave radar. Three synchronized frames are taken as key frames of the three sensors. In order to obtain more data, the millimeter wave radar data and the lidar data, which are obtained by multi-frame scanning, are superimposed on the key frames, and only the key frames are processed later.

The sensors use an Inertial Measurement Unit (IMU) of the vehicle as a reference point. The IMU is installed at a center of the vehicle to obtain information such as a speed and attitude of the vehicle. The following abbreviations are relevant to the equations provided below: translation matrix $T_c$ and rotation matrix $R_c$ of the camera relative to IMU, translation matrix $T_1$ and rotation matrix $R_1$ of the lidar, translation matrix T r and rotation matrix $R_r$ of the millimeter wave radar. Lidar Coordinates (X 1, Y 1, Z 1), millimeter wave radar coordinates (X r, Y r, Z r).

$$\begin{bmatrix} X_l \\ Y_l \\ 1 \end{bmatrix} = \begin{bmatrix} R & T \\ 0 & 1 \end{bmatrix} \begin{bmatrix} X_r \\ Y_r \\ Z_r \end{bmatrix}$$

$$R = R_r * R_1$$

$$T = T_r - T_1$$

Because an altitude of the ground is not the constant, an installation position of the IMU is used as a reference point of the world coordinate system. A normal vector n of a ground plane in an image and a height h of the camera are calculated through the IMU. The rotation matrix of the camera is R c, and the translation matrix T c of an installation position of the camera relative to the sensor. The unit normal vector n r. Available ground function vector [n, Tra[2]] is obtained.

$$R_c = \begin{bmatrix} R_{11} & R_{12} & R_{13} \\ R_{21} & R_{22} & R_{23} \\ R_{31} & R_{32} & R_{33} \end{bmatrix}$$

$$T_c = [T_{11} \ T_{12} \ T_{13}]$$

$$Tra = R_c * T_c^T$$

$$n = R_c * n_r$$

In a preferred embodiment, a calculation is performed on the millimeter wave radar data according to a corresponding radar protocol. The millimeter wave radar data after being calculated contains information such as position, speed, radar reflection area, radar point status, etc.

In preferred embodiment, in step 3: a first region of interest, which is three-dimensional, is generated based on the position, velocity, and radar reflection area of the millimeter wave radar data which has been calculated. A position (i.e., position information calculated from the millimeter wave radar data) of the millimeter wave radar data is used as a center point of a cuboid region of interest, and a direction of a vector velocity is taken as a direction of the cuboid region of interest. A size of the first region of interest is determined according to a size of the radar reflection area Radar Cross Section (RCS). A size of a three-dimensional (3D) frame is determined according to a range of the size of the radar reflection area RCS. When $RCS_{db}$<0, the size of the 3D frame is 0.5 m*0.5 m*1.8 m, when 0<$RCS_{db}$<20, the size of the 3D frame is 2 m*4 m*1.8 m. The 3D frame uses the coding method shown in FIG. 2. In this way, the amount of parameters is reduced. A target $RCS_{db}$ size is shown in Table 1. The size of $RCS_{db}$ of pedestrians and vehicles is more distinguishable.

$$RCS_{db} = 10 \ log(RCS_m{}^2)$$

According to a speed (V x, V y) of the millimeter wave radar point, this speed is an absolute speed. Compensation speed information (V x_comp, V y_comp) is a moving speed of the vehicle obtained according to the IMU. According to the formula:

$$\theta = \tan^{-1} \frac{V_x - V_{x\_comp}}{V_y - V_{y\_comp}}$$

A range of θ is (0, π), and a direction angle of the 3D frame is determined by θ, as shown in FIG. 3.

TABLE 1

| Target | RCS[m²] | RCS[dB] |
|---|---|---|
| Pedestrian | 0.01 | −20 |
| Car | 100 | 20 |
| Truck | 200 | 23 |
| Corner reflection | 20379 | 43 |

In a preferred embodiment, anchor points are set at a certain interval for a blind area in which the millimeter wave radar points is not generated, and each of the anchor points are traversed as a center (i.e., center of a second region of interest) to generate the second region of interest. Each of anchor points generates two 3D frames with two sizes, the frame size (0.5 m*0.5 m*1.8 m) and frame size (2 m*4 m*1.8 m). A short-wave detection range of millimeter wave radar is limited. The short-wave detection range from 0 to 30 meters is 90 degrees, and the short-wave detection range from 30 to 70 meters is reduced to 18 degrees. A long-wave detection angle at 70 meters away is 18 degrees, which will cause the blind area. A range of detecting obstacles is [−30, 30, 0, 70]. The following methods are adopted to realize a position without the region of interest within the range of detecting obstacles.

1) The first region of interest obtained in step 3 is projected onto a bird's-eye view plane.
2) A background area is obtained according to a projected two-dimensional candidate frame.
3) To ensure that a target is not missed, candidate frames are generated by traversing the background area.

In a preferred embodiment, in step 5: original lidar point cloud data (i.e., the original data detected by the lidar) is processed, and lidar points selected within a range of [−0.3, 2.5] meters in a direction perpendicular to the ground plane are retained. The lidar data is equally sliced within the range of [−0.3, 2.5] meters and divided into 4 slices. Each of the 4 slices is compressed into a horizontal two-dimensional image. The horizontal two-dimensional image is combined with intensity information of the lidar points to obtain a point cloud bird's-eye view in a [600 700 5] dimensionality, and a neural network model is used to extract a feature map of the point cloud bird's-eye view and a feature map of the camera image (i.e., the camera data). A size of the feature map is unchanged from a size of an input image (i.e., the camera image and the point cloud bird's-eye view).

In a preferred embodiment, in step 6: there is an index number for the anchor points generated by the millimeter wave radar and the anchor points generated by traversing. The region of interest (i.e., the first region of interest and the second region of interest) is projected into two feature maps. The millimeter wave radar data and the lidar data are both three-dimensional data, and a three-dimensional region of interest can be determined through a spatial synchronization of the two (i.e., the millimeter wave radar data and the lidar data) in step 1. A vertex coordinate of the three-dimensional region of interest R=[x; y; z] is obtained. A conversion relationship of the three-dimensional region of interest is:

$$\begin{bmatrix} X_p \\ Y_p \\ Z \end{bmatrix} = P \begin{bmatrix} R_c & T_c \\ O^T & 1 \end{bmatrix} \begin{bmatrix} x \\ y \\ z \\ 1 \end{bmatrix}$$

(X p, Y p) are coordinates of projection points in an image coordinate system, and P is a matrix of camera parameters. Through the above steps, coordinate points of a 3D area in an image are obtained. Each of the vertex coordinates, which has been obtained, is adjusted according to a ground vector [n Tra[2]] T composed of a normal vector n perpendicular to the ground plane and a camera height Tra[2]. An adjusted coordinate point (X, Y, Z*) is obtained.

$$[nTra[2]]^T = \begin{bmatrix} a \\ b \\ c \\ d \end{bmatrix}$$

Z*=−(a*X+c*Y+d)/b.

The feature maps of the same size are fused to form the fused image, the fused image is processed through the fully connected layer, anchor points are filtered out, and a size and direction of anchor point boxes are regressed.

Compared with the existing techniques, the technical solution has the following advantages.

The present disclosure improves a redundancy of the system through the fusion of three kinds of sensors and ensures a safety of vehicle driving. The method of using a millimeter wave radar to determine a region of interest (ROI) greatly reduces the number of ROIs, reduces a computational burden, and improves a recognition accuracy. The millimeter wave radar reflection area RCS is used to determine the size of the ROI area and provides more flexibility with respect to determining the size of the ROI. A problem of not being able to determine an appropriate size of the ROI for obstacles of different sizes is solved. Through speed information of the millimeter wave radar, the ROI with a direction is generated, which solves a problem of a rotation invariance of an image by a convolutional neural network and improves an accuracy of identifying the direction of the obstacle.

The present disclosure ensures that an automatic driving car can ensure both accuracy and detection speed during target detection, which greatly improves a safety and stability of automatic driving.

DETAILED DESCRIPTION OF THE EMBODIMENTS

The present disclosure will be further described below in combination with the accompanying drawings and embodiments.

Embodiment 1

Figure 5:
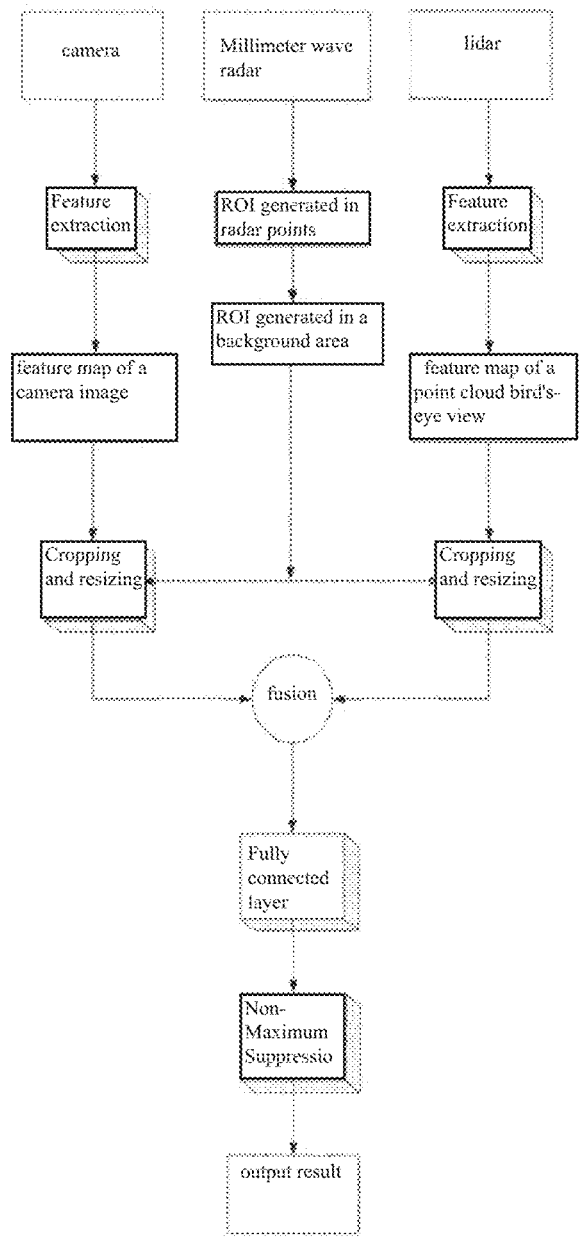
FIG. 5 illustrates a flowchart of target detection using multi-sensor fusion.

A target detection method based on fusion of vision, lidar, and millimeter wave radar is provided. The specific flow chart is shown in FIG. 5. The target detection method comprises the following steps.

Figure 1:
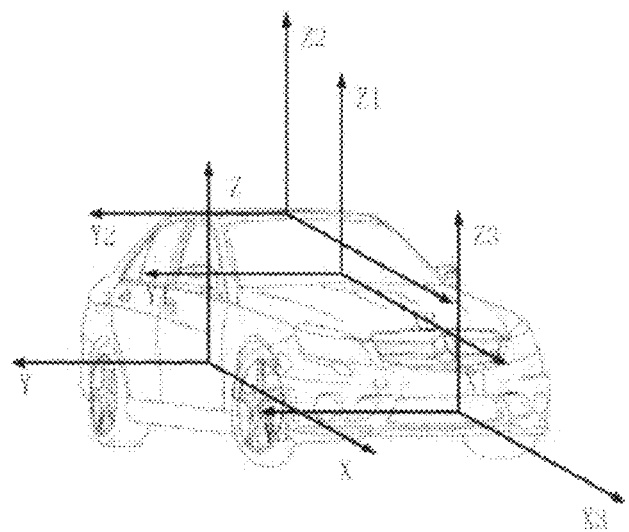
FIG. 1 illustrates a schematic diagram of an installation location of vehicle-mounted millimeter wave radar and a lidar.

Camera data, millimeter wave radar data, and lidar data are obtained in step (1). A camera and a lidar are installed on a top of a vehicle, as shown in FIG. 1. When the lidar sweeps across a center of the camera's Field of View (FOV), exposure of the camera will be triggered. The camera runs at 12 Hz, while the lidar runs at 20 Hz. The exposure of the camera, which runs at 12 Hz, is distributed as evenly as possible in scans of the lidar, which runs at 20 Hz, so not all of the scans of the lidar have corresponding frames of the camera and corresponding frames of the millimeter wave radar. Three synchronized frames are taken as key frames of the three sensors. In order to obtain more data, the millimeter wave radar data, obtained by multi-frame scanning, and the lidar data are superimposed on the key frames, and only the key frames are processed later.

The sensors use an Inertial Measurement Unit (IMU) of the vehicle as a reference point. The IMU is installed at a center of the vehicle to obtain information such as a speed and attitude of the vehicle. The following abbreviations are relevant to the equations provided below: translation matrix $T_c$ and rotation matrix $R_c$ of the camera relative to IMU, translation matrix $T_1$ and rotation matrix $R_1$ of the lidar, translation matrix $T_r$ and rotation matrix $R_r$ of the millimeter wave radar.

$$\begin{bmatrix} X_l \\ Y_l \\ 1 \end{bmatrix} = \begin{bmatrix} R & T \\ 0 & 1 \end{bmatrix} \begin{bmatrix} X_r \\ Y_r \\ Z_r \end{bmatrix}$$

$$R = R_r * R_1$$

$$T = T_r - T_1$$

Because an altitude of the ground is not constant, an installation position of the IMU is used as a reference point of the world coordinate system. A normal vector n of a ground plane in an image and a height h of the camera are calculated through the IMU. The rotation matrix of the camera is $R_c$, and the translation matrix of an installation position of the camera relative to the sensor is $T_c$. A unit normal vector is n r. Available ground function vector [n, Tra[2]] a is obtained.

$$R_c = \begin{bmatrix} R_{11} & R_{12} & R_{13} \\ R_{21} & R_{22} & R_{23} \\ R_{31} & R_{32} & R_{33} \end{bmatrix}$$

$$T_c = \begin{bmatrix} T_{11} & T_{12} & T_{13} \end{bmatrix}$$

-continued $$Tra = R_c * T_c^T$$

$$n = R_c * n_r$$

Figure 2:
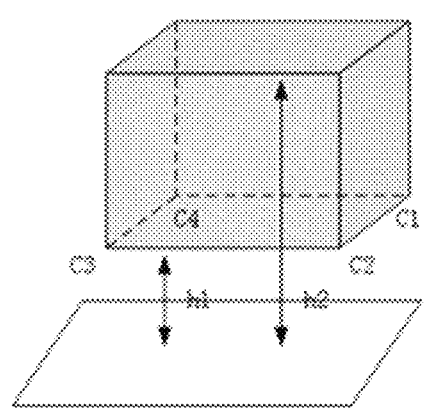
FIG. 2 illustrates a region of interest (ROI) coding method.

Step 2: a calculation is performed on the millimeter wave radar data according to a corresponding radar protocol. The millimeter wave radar data after being calculated contains information such as position, speed, radar reflection area, radar point status, etc., as shown in FIG. 2.

Step 3: a first region of interest, which is three-dimensional, is generated based on the position, velocity, and radar reflection area of the millimeter wave radar data which has been calculated. A position (i.e., position information calculated from the millimeter wave radar data) of the millimeter wave radar data is used as a center point of a cuboid region of interest, and a direction of a vector velocity is taken as a direction of the cuboid region of interest. A size of the first region of interest is determined according to a size of the radar reflection area Radar Cross Section (RCS). A size of a three-dimensional (3D) frame is determined according to a range of the size of the radar reflection area RCS. When $RCS_{db}<0$, the size of the 3D frame is 0.5 m*0.5 m*1.8 m, when $0<RCS_{db}<20$, the size of the 3D frame is 2 m*4 m*1.8 m. The 3D frame uses the coding method shown in FIG. 2. In this way, the amount of parameters is reduced. A target $RCS_{db}$ size is shown in the Table 1. The size of $RCS_{db}$, of pedestrians and vehicles is more distinguishable.

$$RCS_{dB} = 10 \log(RCS_{m^2})$$

According to a speed (V x, V y) of the millimeter wave radar point, this speed is an absolute speed. Compensation speed information (V x_comp, V y_comp) is a moving speed of the vehicle obtained according to the IMU. According to the formula:

$$\theta = \tan^{-1} \frac{V_x - V_{x\_comp}}{V_y - V_{y\_comp}}$$

Figure 3:
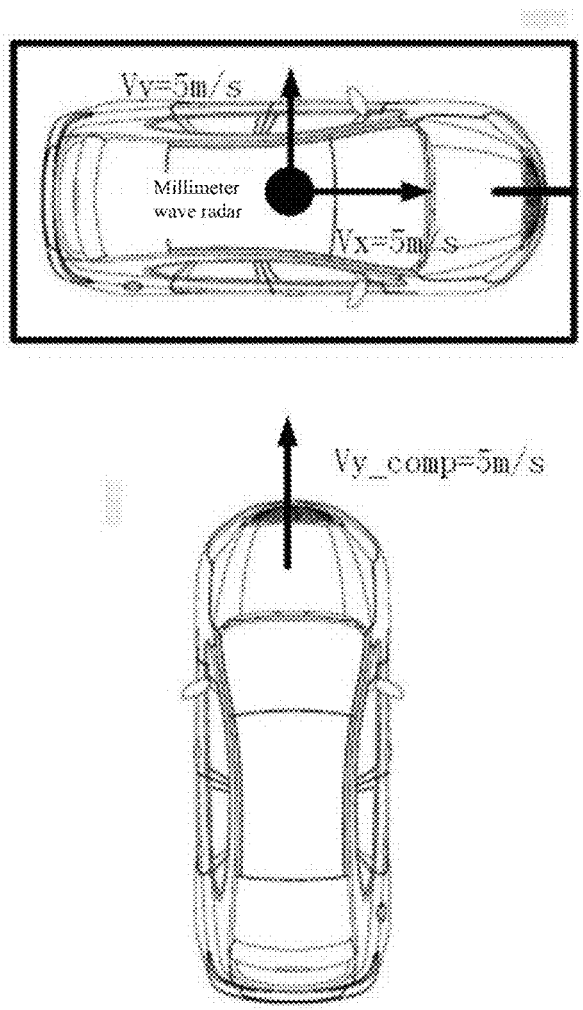
FIG. 3 illustrates a schematic diagram of a speed direction of the millimeter wave radar.

A range of θ is (0, π), and a direction angle of the 3D frame is determined by θ, as shown in FIG. 3.

TABLE 1

| Target | RCS[m²] | RCS[dB] |
|---|---|---|
| Pedestrian | 0.01 | −20 |
| Car | 100 | 20 |
| Truck | 200 | 23 |
| Corner reflection | 20379 | 43 |

Figure 4:
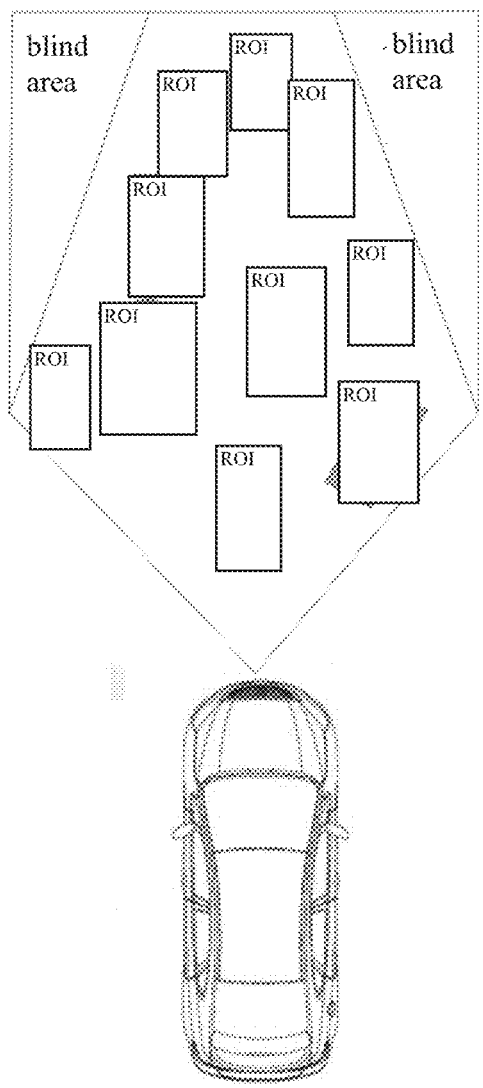
FIG. 4 illustrates a schematic diagram of a ROI area and a background area generated by the millimeter wave radar.

Step 4: anchor points are set at a certain interval for a blind area in which the millimeter wave radar point is not generated, and each of the anchor points are traversed as a center (i.e., center of the second region of interest) to generate a second region of interest. Each of anchor points generates two 3D frames with two sizes, the frame size (0.5 m*0.5 m*1.8 m) and size (2 m*4 m*1.8 m), as shown in FIG. 4. A short-wave detection range of millimeter wave radar is limited. The short-wave detection range from 0 to 30 meters is 90 degrees, and the short-wave detection range from 30 to 70 meters is reduced to 18 degrees. A long-wave detection angle at 70 meters away is 18 degrees, which will cause the blind area. A range of detecting obstacles is [−30, 30, 0, 70]. The following method is adopted for a position where there is no region of interest within the range of detecting obstacles.

1) The first region of interest obtained in step 3 is projected onto a bird's-eye view plane.
2) A background area is obtained according to a projected two-dimensional candidate frame.
3) To ensure that a target is not missed, candidate frames are generated by traversing the background area.

In step 5: original laser point cloud data (i.e., the lidar data) is processed, and lidar points selected within a range of [−0.3, 2.5] meters in a direction perpendicular to the ground plane are reserved. The lidar data is equally sliced within the range of [−0.3, 2.5] meters and divided into 4 slices. Each of the 4 slices is compressed into a horizontal two-dimensional image. The horizontal two-dimensional image is combined with intensity information of the lidar points to obtain a point cloud bird's-eye view in a [600 700 5] dimensionality, and a neural network model is used to extract a feature map of the point cloud bird's-eye view and a feature map of the camera image (i.e., the camera data). A size of the feature map is unchanged from a size of an input image (i.e., the camera image and the point cloud bird's-eye view).

In step 6: there is an index number for the anchor points generated by the millimeter wave radar and the anchor points generated by traversing. The region of interest (i.e., the first region of interest and the second region of interest) is projected into two feature maps. The millimeter wave radar data and the lidar data are both three-dimensional data, and a three-dimensional region of interest can be determined through a spatial synchronization of the two (i.e., the millimeter wave radar data and the lidar data) in step 1. A vertex coordinate of the three-dimensional region of interest R=[x; y; z] is obtained. A conversion relationship of the three-dimensional region of interest is:

$$\begin{bmatrix} X_p \\ Y_p \\ Z \end{bmatrix} = P \begin{bmatrix} R_c & T_c \\ O^T & 1 \end{bmatrix} \begin{bmatrix} x \\ y \\ z \\ 1 \end{bmatrix}$$

$(X_p, Y_p)$ are coordinates of projection points in an image coordinate system, and P is a matrix of camera parameters. Through the above steps, coordinate points of a 3D area in an image are obtained. Each of the vertex coordinates, which has been obtain, is adjusted according to a ground vector [n Tra[2]]$^T$ composed of a normal vector n perpendicular to the ground plane and a camera height Tra[2]. An adjusted coordinate point (X, Y, Z*) is obtained.

$$[nTra[2]]^T = \begin{bmatrix} a \\ b \\ c \\ d \end{bmatrix}$$

$$Z^* = -(a*X + c*Y + d)/b.$$

The feature maps of the same size are fused to form a fused image, the fused image is processed through a fully connected layer, anchor points are filtered out, the size and direction of anchor point boxes are regressed, scores are given for each of the anchor point boxes, and a higher scored anchor point box of the anchor point boxes is filtered through Non-maximum suppression (NMS). A test result is obtained and output.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A target detection method based on fusion of vision, lidar, and millimeter wave radar, comprising:
   (1) obtaining original data detected by each of a camera, a millimeter wave radar, and a lidar, and synchronizing the millimeter wave radar, the lidar, and the camera in time and space;
   (2) performing a calculation on the original data detected by the millimeter wave radar according to a radar protocol;
   (3) using a position based on the original data, which is detected by the millimeter wave radar and has been calculated, as a first anchor point, and generating a first region of interest, which is three-dimensional, according to a speed and a radar reflection area with the first anchor point as a center of the first region of interest;
   (4) generating a second anchor point arranged according to a specified distance in a blind area in which radar points of the millimeter wave radar are not generated, and generating a second region of interest by traversing the second anchor point with the second anchor point as a center of the second region of interest;
   (5) pre-processing the original data detected by the lidar to generate a point cloud bird's-eye view, and extracting a feature map of the point cloud bird's-eye view and a feature map of the original data detected by the camera;
   (6) projecting the first region of interest and the second region of interest generated in step 3 and step 5, which are three-dimensional, onto the feature map of the point cloud bird's-eye view and the feature map of the original data detected by the camera; and
   (7) fusing the first region of interest, the second region of interest, the feature map of the point cloud bird's-eye view, and the feature map of the original data detected by the camera, which have a same size, to form a fused image, processing the fused image through a fully connected layer, and outputting an image of a test result.

2. The target detection method based on fusion of vision, lidar, and millimeter wave radar according to claim 1, wherein:
   the step 1 comprises:
      triggering an exposure of the camera when the lidar sweeps across a center of a Field of View (FOV) of the camera;
      distributing the exposure of the camera in scans of the lidar;
      obtaining synchronized frames of the camera, the millimeter wave radar, and the lidar as key frames of the camera, the millimeter wave radar, and the lidar;
      superimposing millimeter wave radar data and lidar data, which are obtained by multi-frame scanning, onto the key frames; and
      processing the key frames.

3. The target detection method based on fusion of vision, lidar, and millimeter wave radar according to claim 1, wherein:
   in step 2, the original data detected by the millimeter wave radar after being calculated contains information of position, speed, radar reflection area, and radar point status.

4. The target detection method based on fusion of vision, lidar, and millimeter wave radar according to claim 1, wherein:
   the step 3 comprises:
      generating the first region of interest, which is three-dimensional, based on the original data detected by the millimeter wave radar that has been calculated;
      using the position as the first anchor point to generate the first region of interest that is cuboid;
      using a direction of a vector velocity as a direction of the first region of interest;
      determining a size of the first region of interest according to a size of a Radar Cross Section (RCS);
      determining a size of a three-dimensional (3D) frame according to the following table and formula:

| Target | RCS[m²] | RCS[dB] |
| --- | --- | --- |
| Pedestrian | 0.01 | −20 |
| Car | 100 | 20 |
| Truck | 200 | 23 |
| Corner reflection | 20379 | 43 |

$RCS_{dB}=10 \log(RCS_{m^2})$; and determining a direction and an angle of the 3D frame according to a speed ($V_x$, $V_y$) of a millimeter wave radar point and compensation speed information (V x_comp, V y_comp) and according to the formula:

$$\theta = \tan^{-1}\frac{V_x - V_{x\_comp}}{V_y - V_{y\_comp}}.$$

5. The target detection method based on fusion of vision, lidar, and millimeter wave radar according to claim 1, wherein:
   the step 4 comprises:
      arranging the second anchor point at a certain interval in a blind area in which radar points of the millimeter wave radar are not generated; and
      generating the second region of interest by traversing the second anchor point with the second anchor point as the center of the second region of interest,
   the short-wave detection range of millimeter wave radar from 0 to 30 meters is 90 degrees,
   the short-beam detection range of millimeter wave radar from 30 to 70 meters is 18 degrees,
   a long-wave detection angle at 70 meters is 18 degrees,
   a range of detecting obstacles is [−30, 30, 0, 70], and
   a method for determining the blind area comprises:
      (1) projecting the first region of interest obtained in step 3 onto bird's-eye view plane;
      (2) obtaining a background area according to a projected two-dimensional candidate frame; and
      (3) generating candidate frames by traversing the background area.

6. The target detection method based on fusion of vision, lidar, and millimeter wave radar according to claim 1, wherein:

the step 5 comprises:
processing the original data detected by the lidar to reserve lidar points of the original data detected by the lidar selected within a range of [−0.3, 2.5] meters in a direction perpendicular to a ground plane;
equally slicing the lidar points of the original data detected by the lidar selected within the range of [−0.3, 2.5] meters into four slices;
compressing each of the four slices to form a horizontal two-dimensional image;
combining the horizontal two-dimensional image with intensity information of the lidar points to obtain the point cloud bird's-eye view in a [600 700 5] dimensionality; and
using a neural network model to extract the feature map of the point cloud bird's-eye view and the feature map of the original data detected by the camera, and
a size of the feature map is unchanged from a size of an input image.

7. The target detection method based on fusion of vision, lidar, and millimeter wave radar according to claim 1, wherein:

the step 6 comprises:
setting an index number for each of the first anchor point and the second anchor point;
projecting the first region of interest and the second region of interest onto the feature map of the point cloud bird's-eye view and the feature map of the original data detected by the camera;
determining a three-dimensional region of interest through a spatial synchronization of the original data detected by the millimeter wave radar and the lidar in step 1 since the original data detected by the millimeter wave radar and the lidar are both three-dimensional data; and
obtaining a vertex coordinate of the three-dimensional region of interest R=[x; y; z], a conversion relationship of the three-dimensional region of interest is:

$$\begin{bmatrix} X_p \\ Y_p \\ Z \end{bmatrix} = P \begin{bmatrix} R_c & T_c \\ O^T & 1 \end{bmatrix} \begin{bmatrix} x \\ y \\ z \\ 1 \end{bmatrix},$$

$(X_p, Y_p)$ are coordinates of projection points in an image coordinate system,
P is a matrix of camera parameters,
Rc is a rotation matrix of the camera relative to an Inertial Measurement Unit (IMU),
Tc is a translation matrix of the camera relative to the IMU,
coordinate points of a 3D area in an image are obtained through the steps 1-7,
each of the vertex coordinates, which has been obtained, is adjusted according to a ground vector to obtained an adjusted coordinate point (X, Y, Z*),
the feature maps of the same size are fused to form the fused image,
the fused image is processed through the fully connected layer,
anchor points are filtered out, and
a size and direction of anchor point boxes are regressed.

* * * * *